United States Patent [19]

DiMarzio

[11] 4,055,786
[45] Oct. 25, 1977

[54] CONTROL SYSTEM FOR TIME SHARING MULTIPLE STEPPER MOTORS WITH A SINGLE CONTROLLER

[75] Inventor: Alfred W. DiMarzio, Pattersonville, N.Y.

[73] Assignee: General Electric Company, Schenectady, N.Y.

[21] Appl. No.: 683,696

[22] Filed: May 6, 1976

[51] Int. Cl.² ............................................. G05B 11/32
[52] U.S. Cl. .................................. 318/562; 318/102; 318/103; 318/685
[58] Field of Search ............... 318/696, 685, 102, 103, 318/562

[56] References Cited

U.S. PATENT DOCUMENTS

| | | |
|---|---|---|
| 3,317,802 | 5/1967 | Ogden .................................. 318/102 |
| 3,416,053 | 12/1968 | Seiuemon Inaba et al. ......... 318/103 |
| 3,416,054 | 12/1968 | Galles .................................. 318/102 |
| 3,486,093 | 12/1969 | McArthur ............................ 318/103 |

Primary Examiner—Robert K. Schaefer
Assistant Examiner—John J. Feldhaus
Attorney, Agent, or Firm—Donald R. Campbell; Joseph T. Cohen; Jerome C. Squillaro

[57] ABSTRACT

A plurality of stepper motors are energized one at a time in any order by repeating sets of drive pulses generated by a single motor controller. The actual winding state of each motor is stored in a memory unit. Upon selecting the next motor the controller is cycled until the actual motor winding state and controller winding state compare. The selected motor is then switched and moved by steps to a commanded position while entering new motor winding state data into the memory unit.

12 Claims, 4 Drawing Figures

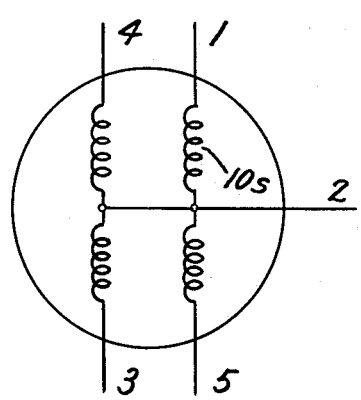
Fig.2
| MOTOR STATE | WINDINGS ENERGIZED | | | |
|---|---|---|---|---|
| | 1 | 4 | 3 | 5 |
| 1 | 1 | 1 | 0 | 0 |
| 2 | 0 | 1 | 1 | 0 |
| 3 | 0 | 0 | 1 | 1 |
| 4 | 1 | 0 | 0 | 1 |
Fig.3.
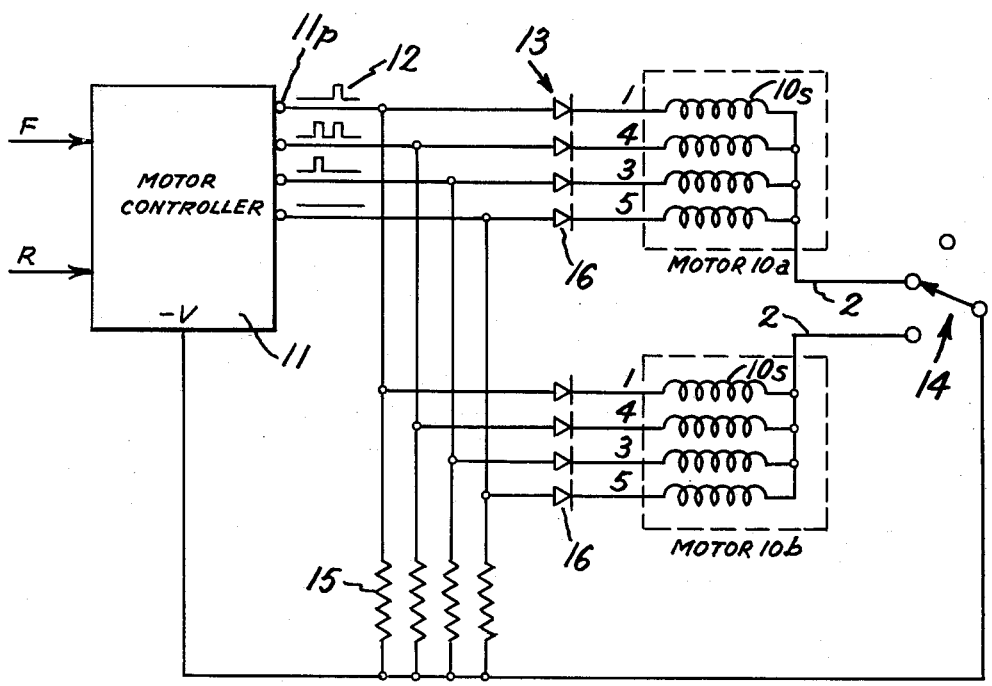
Fig.4.

CONTROL SYSTEM FOR TIME SHARING MULTIPLE STEPPER MOTORS WITH A SINGLE CONTROLLER

BACKGROUND OF THE INVENTION

This invention relates to a control circuit for a plurality of stepper motors, and more particularly to a motor control system with a single motor controller that is time shared among multiple stepper motors.

Stepper motors are commonly used in manufacturing and test systems that require a plurality of low power motors. At present, each individual motor has an associated motor translator or controller. When the motors are operated one at a time and each is used for only a small percentage of the total time, a significant waste in system cost and power consumption occurs. One such application is in the automated IF alignment of a television tuner utilizing numerous stepper motors to adjust the magnetic core components.

SUMMARY OF THE INVENTION

In practicing the invention, the two or more stepper motors and single motor controller can be purchased units, and additional motor control system circuitry is provided as herein taught for energizing the motors one at a time in any order while time sharing the one controller. As is known, each stepper motor has a rotor movable by discrete steps upon being supplied with sets of drive pulses determining the stator winding combinations, or winding states, to be energized sequentially. The motor controller generates the sets of drive pulses in repeating predetermined forward and reverse sequences representing the sequence of winding states for moving a desired motor to the commanded position.

The motor control system as broadly defined further includes a memory unit for each motor for storing drive pulse data representative of the sets of drive pulses and corresponding to the actual winding state for that motor. Means are provided for selecting one motor and cycling the controller until the stored actual motor winding state and controller winding state compare. Additionally, the control system includes means for switching the selected motor for energization and successively supplying motion control pulses to successively trigger the controller and move the selected motor by steps to the commanded position. At the same time the respective memory unit is enabled for entry of the new drive pulse data. In the preferred embodiment, the control system is implemented with a memory data multiplexer, a comparator, an oscillator for generating the controller cycling pulses in response to a non-compare comparator output, and a command unit stored program computer for producing motor selection and motion control pulses. Upon switching a single motor for energization, a switching network is operative to connect the negative motor terminal to the negative controller terminal, and a diode distribution and isolation network coupled between the controller output terminals and each stator winding prevents unwanted interaction between the stator windings. The multiple stepper motor system has numerous applications in manufacturing and test systems in which the motors are used one at a time in any order.

BRIEF DESCRIPTION OF THE DRAWINGS

FIG. 2 is a simplified diagram showing four windings of a stepper motor;

FIG. 3 is a table of the four possible motor states and the pairs of windings energized for each state; and FIG. 4 is a more detailed circuit diagram of the distribution and isolation network and dummy loads illustrating their connections to the motor controller, two stepper motors and motor switching network.

DESCRIPTION OF THE PREFERRED EMBODIMENT

Figure 1:
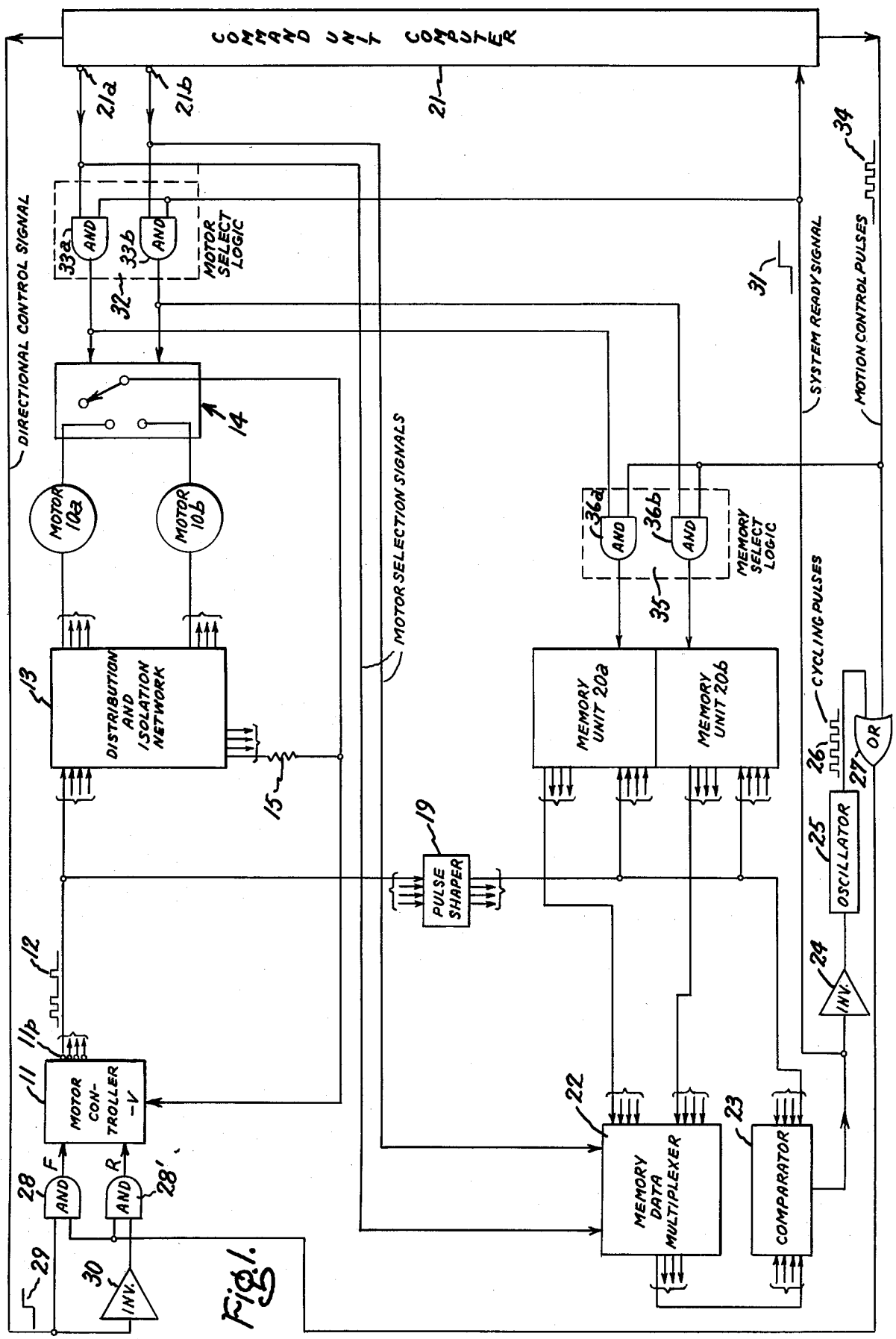
FIG. 1 is a schematic circuit diagram in block diagram form of the motor control system according to the invention for operating multiple stepper motors from a single controller.

The multiple stepper motor system using a single motor controller is described by way of illustration with reference to two alternately energized stepper motors, although in principle numerous stepper motors can be time shared with the controller. In an exemplary application, for example, sixteen stepper motors are utilized one at a time in any order in an automated IF alignment system for a color television chassis. Many stepper motors and controllers or translators can be employed in the practice of the invention, but in the embodiment here described they are purchased units and the auxiliary motor control system circuitry is provided to achieve automated time sharing of the single controller under computer (or manual) control. The invention is ideally suited to low and medium torque applications using two or more motors that are randomly selected and operate independently of one another.

Referring to FIG. 1, motors 10a and 10b are commercially available motors such as the SLO-SYN ® HS50 stepper motor manufactured by the Superior Electric Company of Bristol, Conn. This model moves through 200 discrete steps in each shaft revolution, moving 1.8° per step. As is shown diagrammatically in FIG. 2, the complete stator winding is divided into units of four individual stator windings 10s, here identified for simplicity as windings 1, 4, 3, and 5, each connected to a common or negative terminal 2. To rotate the rotor through discrete steps, the four stator winding combinations or motor winding states together with the pair of windings energized in each state are given in the Table in FIG. 3. For forward rotation, the sequential motor winding states 1–4 are repeated in that order until the required number of steps have been made, while for reverse rotation the reverse order of motor winding states is repeated until the motor has moved to the commanded position. Each motor winding state is designated by a four-bit binary identification in which a "1" represents an energized winding whereas a "0" represents an unenergized winding.

Similarly, single motor controller 11 in FIG. 1 is a commercially available component such as the SLO-SYN ® type HTR400 high speed translator, manufactured by the Superior Electric Company. Upon being supplied with triggering signals at the forward input terminal F or reverse input terminal R, controller 11 sequentially generates sets of drive pulses 12 at its four positive output terminals 11p which are applied through a distribution and isolation network 13 to the stator windings of a selected motor 10a or 10b. As is evident, the sets of four drive pulses 12 are generated in the previously mentioned (see FIG. 3) repeating predetermined forward or reverse sequences representing the sequence of motor winding states for moving a desired motor to a commanded position. Switching network 14 is shown schematically as a three-position manual switch, but is preferably a solid state switching network for effecting connection of the negative terminal of a selected motor to the negative terminal of controller 11. During the switching interval, dummny load resistor 15 also coupled to the negative terminal of controller 11 provides a partial load on the controller during the switching operation.

FIG. 4 shows a more detailed circuit diagram of distribution and isolation network 13 and dummy loads 15 illustrating their connections to the controller, stepper motors, and switching network. The four stator windings 10s of the two stepper motors 10a and 10b are designated in the same manner as in FIGS. 2 and 3 as is the negative motor terminal 2. Assuming that switching network 14 has selected motor 10a for energization, a circuit is completed for this motor to the negative terminal $-V$ of controller 11, whereas all other motors are open-circuited. Distribution and isolation network 13 is comprised of four rectifier diodes 16 per motor, each connected directly between one controller positive output terminal 11p and a respective stator winding 10s. Diodes 16 function to buffer each stepper motor and prevent interaction between designated windings of a selected motor. Assuming two consecutive sets of drive pulses 12, as illustrated, for energizing the winding combinations identified as motor states 1 and 2 in FIG. 3, the first set of drive pulses forward biases the upper two diodes while the lower two diodes are reverse biased and prevent current flow through windings 3 and 5, while for the second set of drive pulses the middle two diodes are forward biased and the upper and lower diodes are reverse biased. Four dummy load resistors 15, as was mentioned, provide a partial load during the switching interval and are each connected directly between the negative terminal $-V$ of controller 11 and a different one of positive output terminals 11p. In addition to being supplied to a pair of windings of the selected motor to rotate the rotor through one incremental step, the set of drive pulses 12 is also fed to a pulse shaper 19 (see FIG. 1) for producing at its four output lines logic-level drive pulse binary data representative of each respective set of drive pulses and corresponding to the actual motor winding state. An individual memory unit is provided for each motor for storing the four-bit drive pulse data indicative of the actual motor winding state. Memory units 20a and 20b for the respective stepper motors 10a and 10b are each, for example, a four-bit flip-flop array that is enabled to store drive pulse data from pulse shaper 19 by the presence at one input of a memory enabling signal as will be explained in detail later. As the stepper motor indexes step by step to the commanded position, corresponding drive pulse data is successively entered into the corresponding memory unit which retains information on the actual motor winding state when the selected motor makes the last step movement to the commanded condition.

Upon the selection of the next motor to be moved by a command unit 21 such as stored program computer, it will be evident that the controller winding state must be identical to the actual motor winding state of the next selected motor before sets of drive pulses can be applied to energize the newly selected motor. In broad terms, this is achieved by cycling controller 11, without the motor connected, to align the controller winding state with the actual motor winding state stored in the memory unit for that motor. The newly selected motor is then connected to the controller. Motor selection signals generated by command unit 21 are fed from separate output terminals 21a and 21b over individual lines to a memory data multiplexer 22. In general, the number of output terminals for motor selection corresponds to the number of stepper motors and, of course, only one motor selection signal is generated at a time. Stored four-bit drive pulse data from memory units 20a and 20b is read out and transmitted to multiplexer 22, the motor selection signal functioning to complete a circuit to the multiplexer output terminals for only the stored drive pulse data for the selected motor. A comparator 23 with provision for comparing four binary bits in parallel has as one input the stored drive pulse data and, as the other input, the generated drive pulse data present at the output of pulse shaper 19 and representative of the drive pulses now being generated by controller 11. In the event of a non-compare, the low comparator output signal is inverter by a sign inverter 24 and used to trigger an oscillator 25. Oscillator 25 produces a cycling pulse 26 which is gated by an OR logic circuit 27 and applied in parallel to a pair of AND logic circuits 28 and 28', at the forward and reverse inputs to controller 11. Command unit 21, in addition to a motor selection signal, also generates a directional control signal 29 that is applied directly to AND circuit 28 and inverted by a sign inverter 30 before being applied as the second input to AND circuit 28'. A forward triggering signal or a reverse triggering signal results depending upon whether directional control signal 29 is high indicating forward motion or low indicating reverse motion. Thus, controller 11 indexes forward or backward and oscillator 25 generates cycling pulses 26 until the controller winding state and stored actual winding motor state compare.

When a compare output is produced by comparator 23, the compare indication is used as a system ready signal 31 and is transmitted to command unit 21 and also to a motor select logic circuit 32. The motor select logic is comprised of a pair of AND circuits 33a and 33b, or in general one for each stepper motor, each AND circuit being connected to a respective command unit output terminal 21a or 21b and also to the comparator output. Upon the coincidence of system ready and motor selection signals at the inputs of one of these AND circuits, a switching output signal is generated for actuating switching network 14. In the manner previously explained, a circuit is completed to the selected motor so that it can be energized by the next set of drive pulses 12. For further information on such a switching network implemented with solid state components, reference may be made to the *SCR Manual*, Fifth Edition, Copyright 1972, published by the General Electric Company.

The application of system ready signal 31 to command unit 21 also initiates the generation by the command unit of one or more motion control pulse 34 corresponding in number to the number of steps required for the selected motor to move from its present position to a new commanded position. Each motion control pulse 34 is gated by OR circuit 27 and applied to both AND circuits 28 and 28' to generate a controller forward triggering signal or reverse triggering signal depending upon the directional control command. Each motion control pulse 34 is also supplied to a memory select logic circuit 35 for enabling the memory unit corresponding to the selected motor for entry of new drive pulse data. The memory select logic is comprised by a pair of AND circuits 36a and 36b, or in general one for each stepper motor. One input to each of these AND circuits is the respective switching output signal from motor select logic circuit 32, while motion control pulse 34 is the other input to each circuit. Thus, upon the coincidence of a switching output signal and motion control pulse, a memory enabling signal is supplied to the one memory unit corresponding to a selected motor. For example, when motor 10a is selected for movement, the set of drive pulses 12 generated by the controller are fed to the designated stator windings of motor 10a and are also fed to pulse shaper 19 to produce new drive pulse data for entry into the enabled memory unit 20a. As is evident, the successive motion control pulses 34 sequentially effect movement of motor 10a through one step per pulse, and the successively generated drive pulse data is entered at each step into memory unit 20a until the commanded position is reached.

In view of the foregoing extensive discussion, only a brief review will be made of the operation of the multiple stepper motor control system to time share a single motor controller. Let it be assumed that motor 10b is to be the next selected motor and that the last known actual winding state of that motor is stored in memory unit 20b. A motor selection signal from command unit 21 is now present at command unit output terminal 21b and is fed to memory data multiplier 22. Motor select logic 32 does not generate a switching output signal at this time since system ready signal 31 is at its low level. Likewise, memory select logic 35 is not producing a memory enabling signal output, and the drive pulse data stored in memory unit 20b is read out and fed to multiplexer 22. Accordingly, drive pulse data indicative of the actual motor winding state of motor 10b is fed out of multiplexer 22 in parallel and becomes one input to four-bit comparator 23. The other input to comparator 23 is generated drive pulse data from pulse shaper 19 indicative of the controller motor winding state. When there is a non-compare output, inverter 24 inverts the signal which is used to trigger oscillator 25 and produce a cycling pulse 26. The cycling pulse is gated by OR circuit 27 and one of AND circuits 28 or 28', depending upon the level of directional control signal 29, to thereby develop either a forward triggering signal or a reverse triggering signal for controller 11. The next set of drive pulses 12 generated by the controller are fed to pulse shaper 19, and the comparison between the controller and actual motor winding states continues sequentially as a cycling pulse 26 is generated for each non-compare and controller 11 indexes until a compare system ready signal 31 is produced. System ready signal 31 is transmitted to command unit 21 and also to motor select logic 32, with the result that AND circuit 33b generates a switching output signal. Switching network 14 operates to effect connection between the negative terminal of motor 10b and the negative terminal —V of controller 11. One or more action control pulses 34 generated by command unit 21 are gated by OR circuit 27 and used to establish either a forward triggering signal or reverse triggering signal as previously explained for controller 11. Each set of drive pulses 12, one set per step movement, now energize the designated windings of motor 10b and the actual motor winding state changes sequentially until the commanded position is reached. Memory select logic 35 is activated by each motion control pulse 34 since the switching output signal from motor select logic 32 is continuously applied to AND circuit 36b which produces a memory enabling signal for memory unit 20b. Thus, four-bit drive pulse data from pulse shaper 19 indicative of each generated set of drive pulses 12 is sequentially entered into memory unit 20b, and upon reaching the commanded position the actual motor winding state for that position is retained in the memory unit. As motor controller 11 is time shared, the stepper motors are operated one at a time in any desired sequence as directed by command unit 21.

The various components of the motor control system, such as pulse shaper 19, memory units 20a and 20b, memory data multiplexer 22, comparator 23, inverters 24 and 30, and oscillator 25 as well as the previously mentioned switching network 14, are preferably solid state components and can be of conventional design as is presently known in the art. Further, the changes in the motor control system needed for manual control will be evident to a person skilled in the art. This system for time sharing multiple stepper motors with a single controller or translator has many applications including television tuner alignment where numerous cores must be adjusted, assembly of small parts where sequential operations are required, and multi-axis manipulations. The advantages of the invention are reduced system cost, reduced power consumption, operation under either computer or manual control, and no change is required to purchased motors and controllers. In the system shown, there is no holding torque for an unselected motor, but this can be provided if required.

While the invention has been particularly shown and described with reference to a preferred embodiment thereof, it will be understood by those skilled in the art that the foregoing and other changes in form and details may be made therein without departing from the spirit and scope of the invention.

The invention claimed is:

1. A motor control system for multiple stepper motors comprising a plurality of stepper motors each having a rotor movable by discrete steps upon being supplied with sets of drive pulses determining stator winding combinations to be energized sequentially, a single motor controller for generating said sets of drive pulses in repeating predetermined forward and reverse sequences representing the sequence of winding states for moving a desired motor to a commanded position, a memory unit for each motor for storing drive pulse data representative of said sets of drive pulses and corresponding to the actual motor winding state, means for selecting one motor and cycling said controller until the actual motor winding state stored in said memory unit and the controller winding state compare, and means for switching the selected motor for energization and successively triggering said controller to move the selected motor to the commanded position while enabling the respective memory unit for entry of drive pulse data.

2. The motor control system defined in claim 1 wherein said controller has a negative terminal and a plurality of output terminals for conducting said sets of drive pulses, said means for switching the selected motor comprises a switching network for effecting connection of the selected motor negative terminal to the negative terminal of said controller, and a distribution and isolation network including a rectifier in series between each output terminal and each stator winding to prevent unwanted interaction between designated stator windings of the selected motor.

3. A motor control system for multiple stepper motors comprising
   a plurality of stepper motors each having a rotor movable by discrete steps upon being supplied with sets of drive pulses determining stator winding combinations to be energized sequentially.
   a single motor controller for generating said sets of drive pulses in repeating predetermined forward and reverse sequences representing the sequence of winding states for moving a desired motor to a commanded position,
   a memory unit for each motor for storing drive pulse data representative of said sets of drive pulses and corresponding to the actual motor winding state,
   means for selecting one motor and for comparing the actual winding state of that motor stored in said memory unit with the controller winding state, and means for cycling said controller until the winding states compare,
   switching means for connecting the selected motor for energization, and
   means for generating motion control pulses for sequentially triggering said controller and moving the selected motor through one step per motion control pulse to the commanded position and for enabling the corresponding memory unit for entry of said drive pulse data.

4. The motor control system defined in claim 3 wherein said means for selecting one motor and comparing the winding states is comprised by a command unit for generating a motor selection signal, a multiplexer actuated by said motor selection signal for transmitting stored drive pulse data for the selected motor from the corresponding memory unit to one input of a comparator, the other input to said comparator being generated drive pulse data representative of the set of drive pulses then being generated by said controller, said comparator producing a non-compare output when the actual motor and controller winding states are different and a system ready signal when there is a compare.

5. The motor control system defined in claim 4 wherein said means for cycling said controller comprises an oscillator actuated by said non-compare output for producing at least one cycling pulse for triggering said controller.

6. The motor control circuit defined in claim 5 wherein said means for selecting one motor is further comprised by a motor select logic circuit for each motor which generates a switching output signal upon the coincidence at the inputs thereof of said motor selection and system ready signals.

7. The motor control system defined in claim 6 wherein each motor and said controller has a negative terminal, and said switching means comprises a switching network for effecting connection of the negative terminal of the selected motor to the negative terminal of said controller.

8. The motor control system defined in claim 7 wherein said controller has a plurality of output terminals for conducting said sets of drive pulses, and the control system further includes a distribution and isolation network including a diode in series between each output terminal and each stator winding of each motor that is selectively reverse biased to prevent unwanted interaction between designated stator windings of a selected energized motor.

9. The motor control system defined in claim 8 further including a dummy load resistor connected directly between the negative terminal of said controller and each controller output terminal.

10. The motor control system defined in claim 7 wherein said means for generating motion control pulses and enabling the corresponding memory unit comprises said command unit which is operative to generate the motion control pulses for sequentially triggering said controller after receiving said system ready signal, and further comprises a memory select logic circuit for each memory unit that produces a memory enabling signal upon the coincidence at the inputs thereof of said switching output signal and one of said motion control pulses.

11. The motor control system defined in claim 3 wherein said controller has a negative terminal and a plurality of output terminals for conducting said sets of drive pulses, said switching means comprises a switching network for effecting connection of the negative terminal of the selected motor to the negative terminal of said controller, and the control system further includes a distribution and isolation network including a rectifier in series between each output terminal and each stator winding that is selectively reverse biased to prevent unwanted interaction between designated stator windings of a selected energized motor.

12. The motor control system defined in claim 11 further including a dummy load resistor connected directly between the negative terminal of said controller and each controller output terminal to provide a partial load for the controller during operation of said switching means.

* * * * *